United States Patent Office 3,483,251
Patented Dec. 9, 1969

---

3,483,251
REDUCTIVE ALKYLATION PROCESS
Ronald Theodore Zambrano, Paterson, N.J., assignor to American Cyanamid Company, Stamford, Conn., a corporation of Maine
No Drawing. Filed Mar. 3, 1967, Ser. No. 620,294
Int. Cl. C07c 103/19; A61k 27/00
U.S. Cl. 260—559
10 Claims

ABSTRACT OF THE DISCLOSURE

This disclosure describes a process for the preparation of the biologically active 7-mono(lower alkyl)aminotetracyclines and 7-di(lower alkyl)aminotetracyclines by the reductive alkylation of 7-(N,N'-dicarbobenzyloxyhydrazino)tetracyclines and 7-(N,N'-dicarbobenzyloxyhydrazino)-11a-halotetracyclines.

BRIEF SUMMARY OF THE INVENTION

This invention relates to a novel reductive alkylation process for preparing compounds having the following general formula:

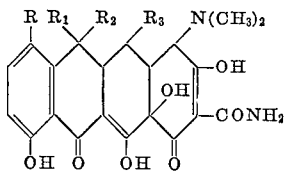

wherein R is mono(lower alkyl)amino or di(lower alkyl)amino; $R_1$ is hydrogen, α-methyl or β-methyl; $R_2$ is hydrogen or β-hydroxy with the proviso that when $R_1$ is β-methyl then $R_2$ is hydrogen; $R_1$ and $R_2$ taken together is methylene; and $R_3$ is hydrogen or hydroxy with the proviso that when $R_3$ is hydroxy then $R_1$ is methyl or $R_1$ and $R_2$ taken together is methylene. More particularly, the present invention comprises interacting a compound of the following general formulae:

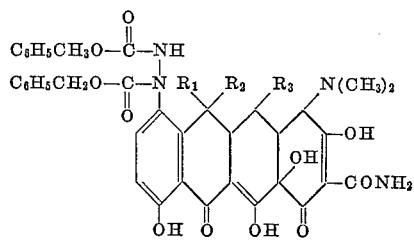

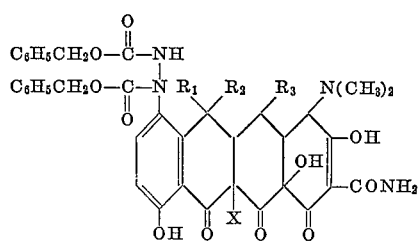

wherein $R_1$, $R_2$ and $R_3$ are as hereinabove defined and X is fluoro, chloro or bromo, with a carbonyl compound of the general formula:

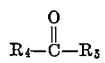

wherein $R_4$ is hydrogen or lower alkyl and $R_5$ is hydrogen or lower alkyl, in the presence of a reducing agent.

DETAILED DESCRIPTION OF THE INVENTION

It is to be understood that when the term "lower alkyl" is used throughout this specification, it is meant to include all lower alkyl groups having up to about 6 carbon atoms. Accordingly, aldehydes and ketones useful in carrying out the novel reductive alkylation of the present invention include, for example, formaldehyde, acetaldehyde, propionaldehyde, n-butyraldehyde, isobutyraldehyde, acetone, methyl ethyl ketone, diethyl ketone, etc.

Specific starting materials operable in the novel process of the present invention include:

7-(N,N'-dicarbobenzyloxyhydrazino)tetracycline,
7-(N,N'-dicarbobenzyloxyhydrazino)-5-hydroxytetracycline,
7-(N,N'-dicarbobenzyloxyhydrazino)-6-demethyltetracycline,
7-(N,N'-dicarbobenzyloxyhydrazino)-11a-chloro-6-demethyltetracycline,
7-(N,N'-dicarbobenzyloxyhydrazino)-6α-methyl-6-deoxytetracycline,
7-(N,N'-dicarbobenzyloxyhydrazino)-11a-bromo-6β-methyl-6-deoxytetracycline,
7-(N,N'-dicarbobenzyloxyhydrazino)-6-demethyl-6-deoxytetracycline,
7-(N,N'-dicarbobenzyloxyhydrazino)-11a-chloro-6-demethyl-6-deoxytetracycline,
7-(N,N'-dicarbobenzyloxyhydrazino)-11a-bromo-6-demethyl-6-deoxytetracycline,
7-(N,N'-dicarbobenzyloxyhydrazino)-11a-fluoro-6-demethyl-6-deoxytetracycline,
7-(N,N'-dicarbobenzyloxyhydrazino)-6-demethyl-6-deoxy-6-methylene-5-hydroxytetracycline,
7-(N,N'-dicarbobenzyloxyhydrazino)-6-deoxy-5-hydroxytetracycline, and the like. The tetracycline starting materials may be employed in the novel process of the present invention either in the form of their free bases or in the form of their salts with various organic and inorganic acids depending upon whether solubility in polar or non-polar solvent systems is desired.

The tetracycline starting materials for the novel process of the present invention may be prepared by interacting a compound of the following general formulae:

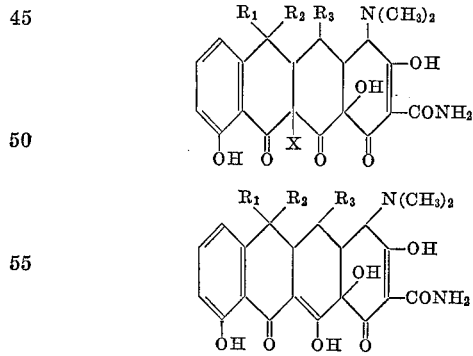

wherein $R_1$, $R_2$, $R_3$ and X are as hereinabove defined, with dibenzyl axodiformate. This reaction is conveniently carried out in an acidic medium and at temperatures of 0° C. or less for a period of time not exceeding several hours. However, room temperature may be employed for relatively short periods of time not exceeding one hour. The acidic medium consists primarily of a strong acid such as concentrated sulfuric acid, trifluoroacetic acid, methanesulfonic acid, 50% sulfuric acid, glacial acetic acid with concentrated sulfuric acid, 70% perchloric acid, and the like. Where needed, varying amounts of an inert solvent may be added to the acidic medium for purposes of solubilizing the reactants. Suitable inert solvents are, for example, benzene, toluene, dioxane, chloroform, carbon tetrachloride, dimethylformamide, tetrahydrofuran, and the like.

The novel reductive alkylation process of the present invention may be accomplished by either chemical or catalytic reduction using procedures well known to those in the art. Catalytic reduction, which is especially suited for the reductive alkylation of the tetarcycline starting compounds set forth above, may be accomplished in a solvent for the tetracycline starting compound in the presence of a carbonyl compound and a metal catalyst and hydrogen gas at pressures from atmospheric to superatmospheric. Ordinarily, the reductive alkylation is conveniently carried out at hydrogen pressures of from about one to about four atmospheres. Temperatures do not appear to be critical in the catalyst hydrogenation. Temperatures of from 0° C. to 50° C., and usually room temperature, are preferred since they generally give best results. The metal catalyst may be of the base metal type, such as nickel or copper chromite, or it may be of the noble metal type, such as finely divided platinum, palladium or rhodium. The noble metal catalysts are advantageously employed on a carrier such as finely divided alumina, activated charcoal, diatomaceous earth, etc., in which form they are commonly available. The hydrogenation is carried out until the desired amount of hydrogen gas is absorbed at which point the hydrogenation is stopped. The solvents selected for the catalytic reduction should be reaction-inert, that is, they should not be capable of reacting with the starting materials, product, or hydrogen under the conditions of the reaction. A variety of solvents may be used for this purpose and minimum laboratory experimentation will permit the selection of a suitable solvent for any specific tetracycline starting compound. Generally, the catalytic reductive alkylation may be carried out in solvents such as water, lower alkanols, e.g. methanol, ethanol; lower alkoxy lower alkanols, e.g. 2-methoxyethanol, 2-ethoxyethanol; tetrahydrofuran, dioxane, dimethylformamide, etc.

A variety of chemical reducing agents may be used in the novel reductive alkylation process of the present invention. These include reduction with active metals in mineral acids, e.g., zinc, tin, or iron in hydrochloric acid; reduction with metal couples such as the copper-zinc couple, the tin-mercury couple, aluminum amalgam, or magnesium amalgam; and reduction with formic acid. Of these, reduction with zinc and hydrochloric acid and reduction with formic acid are preferred. When aqueous systems are used in the aforementioned chemical reductive alkylations, it is at times desirable to utilize a water-miscible organic solvent, particularly when the tetracycline starting compound is of limited solubility in the reaction mixture. The water-miscible solvent does not alter the course of the reduction but merely provides for more efficient reduction, e.g. a shorter reaction time by providing more intimate contact of the reagents. A large number of such solvents are available for this purpose and include, among others, dimethylformamide, dimethoxyethane, methanol, ethanol, dioxane, tetrahydrofuran, and the like.

Whether a 7-mono(lower alkyl)aminotetracycline or a 7-di(lower alkyl)aminotetracycline is obtained is primarily dependent upon the ratio of carbonyl compound employed per mole of 7-(N,N'-dicarbobenzyloxyhydrazino)tetracycline or 7 - (N,N' - dicarbobenzyloxyhydrazino)-11a-halotetracycline starting material and upon the degree of hydrogen absorption when catalytic reduction is employed. For example, a mole per mole ratio of carbonyl compound to tetracycline starting material favors the formation of the 7-mono(lower alkyl)amino derivative whereas the use of an excess of carbonyl compound favors the formation of the 7-di(lower alkyl)amino derivative. In like manner, a minimum hydrogen absorption indicates the formation of the 7-mono(lower alkyl)amino derivative whereas hydrogen absorption ad libitum indicates the formation of the 7-di(lower alkyl)amino derivative. Furthermore, the 7-di(lower alkyl)amino derivative will be the major product when a straight chain carbonyl compound is employed whereas the 7-mono (lower alkyl)amino derivative will be the major product when a branched chain carbonyl compound is employed, due to steric effects.

The products are obtained from the reductive alkylation reaction mixtures by standard procedures. For example, the products may be isolated from the catalytic hydrogenation reaction mixtures, after filtration of the catalyst, by precipitation with a solvent such as ether or hexane or by concentration, usually under reduced pressure, or by a combination of these. Work-up of the chemical reductive alkylation reaction mixtures to obtain the desired products may also be accomplished by known procedures such as precipitation, concentration, solvent extraction, or combinations of these procedures. After isolation, the products may be purified by any of the generally known methods for purification of tetracycline compounds. These include recrystallization from various solvents and mixed solvent systems, chromatographic techniques, and counter current distribution, all of which are usually employed for this purpose.

Typical compounds which may be prepared by the novel reductive alkylation process of the present invention include, for example:

7-dimethylamino-demethyl-6-deoxytetracycline,
7-diethylamino-6-demethyl-6-deoxytetracycline,
7-isopropylamino-6-demethyl-6-deoxytetracycline,
7-isopropylaminotetracycline,
7-isobutylamino-5-hydroxytetracycline,
7-dimethylamino-6-demethyltetracycline,
7-di-(n-propyl)amino-6-deoxy-6α-methyltetracycline,
7-di(n-butyl)amino-6-deoxy-6β-methyltetracycline,
7-methylamino-6-demethyl-6-deoxy-6-methylene-5-hydroxytetracycline, and
7-ethylamino-6-deoxy-5-hydroxytetracycline.

The tetracyclines produced by the novel reductive alkylation process of the present invention are biologically active and possess the broad-spectrum anti-bacterial activity of the previously known tetracyclines. In particular, the 7-dimethylamino-6-demethyl-6-deoxytetracycline, 7-diethylamino-6-demethyl-6-deoxytetracyclinne and 7-isopropylamino-6-demethyl-6-deoxytetracycline possess extraordinary activity both orally and parenterally against *Staphylococcus aureus*, strain Smith, and *Staphylococcus aureus*, strain Rose, infections in mice.

The invention will be described in greater detail in conjunction with the following specific examples.

EXAMPLE 1

Preparation of 7 - [1,2-bis-(carbobenzyloxy)hydrazino]-6-demethyl-6-deoxytetracycline A 3.84 gram portion of 6-demethyl-6-deoxytetracycline neutral was dissolved in a mixture of 7.7 milliliters of tetrahydrofuran and 69 milliliters of methanesulfonic acid. The solution was cooled to 0° C. to 5° C. in an ice bath. A solution of 3.32 grams of the dibenzyl ester of azodiformic acid in 3.1 milliliters of tetrahydrofuran was added dropwise while the temperature was maintained at 0° C. to 5° C. The mixture was stirred for 10 minutes and then the reaction was quenched in one liter of ice water. This mixture was extracted with 200 milliliters of butanol followed by three successive 100 milliliter portions of butanol. The combined butanol extract was washed repeatedly with a saturated saline solution and finally with water. The washed butanol extract was evaporated to dryness. The residue was triturated with ether. The solid was filtered off, washed with ether and then dried, yielding 5.55 grams by weight of 7-[1,2-bis-(carbobenzyloxy)hydrazino]-6-demethyl - 6 - deoxytetracycline.

EXAMPLE 2

Preparation of 7 - [1,2-bis-(carbobenzyloxy)hydrazino]-11a-chloro-6-demethyl-6-deoxytetracycline A 4.0 gram sample of 11a-chloro-6-demethyl-6-deoxytetracycline was dissolved in 15 ml. of tetrahydrofuran and added to 60 ml. of methanesulfonic acid pre-cooled to 0° C. The stirred mixture was treated dropwise with a solution of 3.2 grams of dibenzyl azodiformate dissolved in 4.0 ml. of tetrahydrofuran. The reaction was conducted for fifteen minutes and then poured into one liter of ice water. When neutralized to pH 5.5 by the addition of 25% aqueous ammonium hydroxide, the product precipitated. When collected by filtration and dried, 5.1 grams of 7 - [1,2 - bis - (carbobenzyloxy)hydrazino]-11a-chloro-6-demethyl-6-deoxytetracycline was obtained. Removal of the 11a chlorine atom by reduction in aqueous alcoholic sodium bisulfite solution yielded 7-[1,2-bis-(carbobenzyloxy)-hydrazino]-6-demethyl - 6 - deoxytetracycline identical to the product of Example 1.

EXAMPLE 3

Preparation of 7 - [1,2-bis-(carbobenzyloxy)hydrazino]-6-deoxy-6-demethyltetracycline A 4.14 gm. portion of 6-deoxy-6-demethyltetracycline was dissolved in 100 ml. of glacial acetic acid. The solution was cooled in an ice-bath and 20 ml. of concentrated sulfuric acid was added at such a rate that the temperature did not exceed 25° C. The solution was then cooled to 0 to 5° C. and a mixture of 4.14 gm. of dibenzyl azodicarboxylate in 5 ml. of tetrahydrofuran was added. The reaction mixture was stored at 5° C. overnight and then poured into 1 liter of water. The mixture was extracted three times with butanol. The combined butanol extracts were washed three times with saturated saline and then three times with water. The butanol was evaporated to dryness and the residue was dissolved in 50 ml. of methanol. The methanol solution was added to 1 liter of diethyl ether and a 6.37 gram portion of the product was collected by filtration.

EXAMPLE 4

Prepartion of 7 - [1, 2-bis-(carbobenzyloxy)hydrazino]-6-deoxy-6-demethyltetracycline To a cold (−15° C.) solution of 207 mg. of 6-deoxy-6-demethyltetracycline in 1 ml. of tetrahydrofuran there was added dropwise 3.5 ml. of methanesulfonic acid. The temperature during the addition was not allowed to rise above −15° C. The temperature was then held at 0° C. while a solution of 207 mg. of dibenzyl azodicarboxylate in 0.5 ml. of tetrahydrofuran was added. After ten minutes reaction time, paper chromatographs revealed the presence of the desired product.

EXAMPLE 5

Preparation of 7 - [1,2-bis-(carbobenzyloxy)hydrazino]-6-deoxy-6-demethyltetracycline A 414 mg. portion of 6-deoxy-6-demethyltetracycline neutral was dissolved in 10 ml. of 70% perchloric acid at 0 to 10° C. The solution was warmed to 5° C. and placed in an external ice-water bath. A solution of 414 mg. of dibenzyl azodiformate in 2 ml. of tetrahydrofuran was added. After 10 minutes, the reaction mixture was quenched in 150 ml. of 50% aqueous saline. The product was extracted with 1×100 ml. and 2×75 ml. of portions of butanol. The product was identified by paper chromatography.

EXAMPLE 6

Preparation of 7 - [1,2-bis-(carbobenzyloxy)hydrazino]-6-deoxy-6-demethyltetracycline A 414 mg. portion of 6-deoxy-6-demethyltetracycline neutral was dissolved in 7 ml. of trifluoroacetic acid at 0–5° C. A 414 mg. portion of dibenzyl azodiformate in 1.5 ml. of tetrahydrofuran was added and the solution was allowed to stand overnight at 4° C. The reaction solution was poured into water and the precipitated product was collected by filtration and dried in vacuo.

EXAMPLE 7

Preparation of 7 - (N,N'-dicarbobenzyloxyhydrazino)-6-demethyltetracycline

A 1.0 gram portion of 6-demethyltetracycline was dissolved in a mixture of 9.6 milliliters of tetrahydrofuran and 10.4 milliliters of methanesulfonic acid at −10° C. The mixture was allowed to warm to 0° C. A solution of 0.86 grams of dibenzyl azodicarboxylate in 0.5 milliliters of tetrahydrofuran was added dropwise and the mixture was stirred for 2 hours while the temperature was maintained at 0° C. The reaction mixture was added to ether. The product was filtered off, washed with ether and then dried. The 7 - (N,N'-dicarbobenzyloxyhydrazino)-6-demethyltetracycline was identified by paper chromatography.

EXAMPLE 8

Reductive methylation of 7-(N,N'-dicarbobenzyloxyhydrazino)-6-demethyl-6-deoxytetracycline to 7-dimethylamino-6-demethyl-6-deoxytetracycline A solution of 100 milligrams of 7-(N,N'-dicarbobenzyloxyhydrazino)-6-demethyl-6-deoxytetracycline in 2.6 milliliters of methanol, 0.4 milliliters of 40% aqueous formaldehyde solution and 50 milligrams of 5% palladium on carbon catalyst was hydrogenated at room temperature and two atmospheres pressure. Uptake of the hydrogen was complete in three hours. The catalyst was filtered off and the solution was taken to dryness under reduced pressure. The residue was triturated with ether and then identified as 7-dimethylamino-6-demethyl-6-deoxytetracycline by comparison with an authentic sample.

EXAMPLE 9

Reductive methylation of 7-(N,N'-dicarbobenzyloxyhydrazino)-6-demethyltetracycline to 7 - dimethylamino-6-demethyltetracycline A solution of one millimole of 7-(N,N'-dicarbobenzyloxyhydrazino)-6-demethyltetracycline in 90 milliliters of 2-methoxyethanol, 1.5 milliliters of 40% aqueous formaldehyde solution and 300 milligrams of 10% palladium on carbon catalyst was hydrogenated at room temperature and atmospheric pressure. Uptake of the hydrogen was complete in two hours. The catalyst was filtered off and the solution was poured into 1.5 liters of dried diethyl ether. The precipitate was filtered off, washed with dried diethyl ether and then dried. The product was identified as 7-dimethylamino-6-demethyltetracycline by paper chromatography.

EXAMPLE 10

Preparation of 7-dimethylamino-α-6-deoxy-5-hydroxytetracycline

A solution of 50 milligrams of α-6-deoxy-5-hydroxytetracycline and 39 milligrams of dibenzyl azodicarboxylate in 1.5 milliliters of trifluoroacetic acid was stored at 5° C. overnight. The solution was then evaporated to dryness and triturated with ether, yielding 50 milligrams of solid product. This entire 50 milligrams was dissolved in 3 milliliters of methyl Cellosolve and 0.5 milliliters of 2 N $H_2SO_4$. This mixture was reduced with 25 milligrams of palladium-on-carbon catalyst and hydrogen at standard pressure and room temperature for 2 hours. To this mixture was added a solution of 0.75 milliliters of 37% formaldehyde in 3 milliliters of methyl Cellosolve. The solution was then reduced for an additional 2 hours. The catalyst was filtered off and the filtrate was evaporated to a small volume and then poured into ether. The solvent was evaporated yielding 30 milligrams of the desired 7-dimethylamino-α-6-deoxy-5-hydroxytetracycline.

What is claimed is:

1. The process of preparing compounds of the formula:

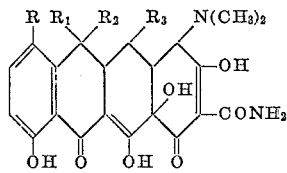

wherein R is selected from the group consisting of mono-(lower alkyl)amino and di(lower alkyl)amino, $R_1$ is selected from the group consisting of hydrogen, α-methyl and β-methyl, $R_2$ is selected from the group consisting of hydrogen and β-hydroxy with the proviso that when $R_1$ is β-methyl then $R_2$ is hydrogen, $R_1$ and $R_2$ taken together is methylene, and $R_3$ is selected from the group consisting of hydrogen and hydroxy with the proviso that when $R_3$ is hydroxy then $R_1$ is methyl or $R_1$ and $R_2$ taken together is methylene; which comprises contacting a compound of the formula:

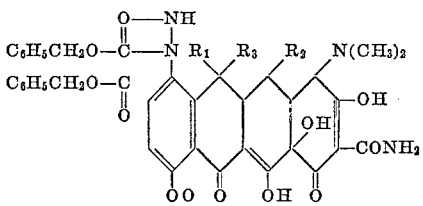

wherein $R_1$, $R_2$ and $R_3$ are as hereinabove defined, with a carbonyl compound of the formula:

wherein $R_4$ and $R_5$ are the same or different and are each selected from the group consisting of hydrogen and lower alkyl, in the presence of a reducing agent.

2. A process according to claim 1 wherein R is dimethylamino; $R_2$ is β-hydroxy; $R_1$, $R_3$, $R_4$ and $R_5$ are hydrogen; and the reducing agent is hydrogen and a noble metal hydrogenation catalyst.

3. A process according to claim 1 wherein R is dimethylamino; $R_1$, $R_2$, $R_3$, $R_4$ and $R_5$ are hydrogen; and the reducing agent is hydrogen and a noble metal hydrogenation catalyst.

4. A process according to claim 1 wherein R is diethylamino; $R_1$, $R_2$, $R_3$ and $R_4$ are hydrogen; $R_5$ is methyl; and the reducing agent is hydrogen and a noble metal hydrogenation catalyst.

5. A process according to claim 1 wherein R is isopropylamino; $R_1$, $R_2$ and $R_3$ are hydrogen; $R_4$ and $R_5$ are methyl; and the reducing agent is hydrogen and a noble metal hydrogenation catalyst.

6. The process of preparing compounds of the formula:

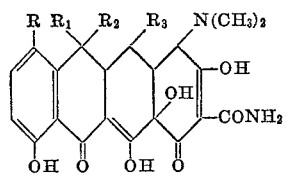

wherein R is selected from the group consisting of mono (lower alkyl)amino and di(lower alkyl)amino, $R_1$ is selected from the group consisting of hydrogen, α-methyl and β-methyl, $R_2$ is selected from the group consisting of hydrogen and β-hydroxy with the proviso that when $R_1$ is β-methyl then $R_2$ is hydrogen, $R_1$ and $R_2$ taken together is methylene, and $R_3$ is selected from the group consisting of hydrogen and hydroxy with the proviso that when $R_3$ is hydroxy then $R_1$ is methyl or $R_1$ and $R_2$ taken together is methylene; which comprises contacting a compound of the formula:

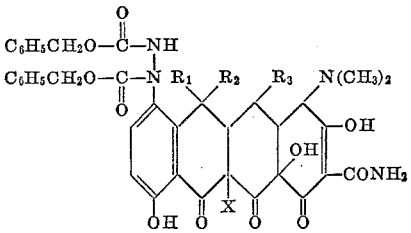

wherein $R_1$, $R_2$ and $R_3$ are as hereinabove defined and X is selected from the group consisting of fluoro, chloro and bromo, with a carbonyl compound of the formula:

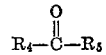

wherein $R_4$ and $R_5$ are the same or different and are each selected from the group consisting of hydrogen and lower alkyl, in the presence of a reducing agent.

7. A process according to claim 6 wherein R is dimethylamino; $R_2$ is β-hydroxy; $R_1$, $R_3$, $R_4$ and $R_5$ are hydrogen; X is chloro; and the reducing agent is hydrogen and a noble metal hydrogenation catalyst.

8. A process according to claim 6 wherein R is dimethylamino; $R_1$, $R_2$, $R_3$, $R_4$ and $R_5$ are hydrogen; X is fluoro; and the reducing agent is hydrogen and a hydrogenation catalyst selected from the group consisting of platinum, palladium and rhodium distributed on an inert carrier.

9. A process according to claim 6 wherein R is diethylamino; $R_1$, $R_2$, $R_3$ and $R_4$ are hydrogen; $R_5$ is methyl; X is chloro; and the reducing agent is hydrogen and a hydrogenation catalyst selected from the group consisting of platinum, palladium and rhodium distributed on an inert carrier.

10. A process according to claim 6 wherein R is isopropylamino; $R_1$, $R_2$ and $R_3$ are hydrogen; $R_4$ and $R_5$ are methyl; X is bromo; and the reducing agent is hydrogen and a hydrogenation catalyst selected from the group consisting of platinum, palladium and rhodium distributed on an inert carrier.

References Cited

UNITED STATES PATENTS

| | | |
|---|---|---|
| 3,148,212 | 9/1964 | Boothe et al. |
| 3,226,436 | 12/1965 | Petisi et al. |
| 3,403,179 | 9/1968 | Zambrano. |

NICHOLAS S. RIZZO, Primary Examiner.

ANNE MARIE T. TIGHE, Assistant Examiner

U.S. Cl. X.R.

424—227

PO-1050
(5/69)

UNITED STATES PATENT OFFICE
CERTIFICATE OF CORRECTION

Patent No. 3,483,251      Dated December 9, 1969

Inventor(s) Ronald Theodore Zambrano

It is certified that error appears in the above-identified patent and that said Letters Patent are hereby corrected as shown below:

Column 1, lines 41-50, that portion of the formula reading $C_6H_5CH_3O-\overset{\overset{O}{\|}}{C}-\underset{|}{NH}$ should read $C_6H_5CH_2O-\overset{\overset{O}{\|}}{C}-\underset{|}{NH}$ Column 2, line 61, "axodiformate" should read -- azodiformate --
Column 3, line 8, "tetarcycline" should read -- tetracycline --
line 16, "catalyst" should read -- catalytic --. Column 4,
line 28, "7-dimethylamino-demethyl-6-deoxytetracycline" should
read -- 7-dimethylamino-6-demethyl-6-deoxytetracycline --;
line 45, "deoxytetracyclinne" should read -- deoxytetracycline
Column 7, lines 21-30, the formula reading [chemical structure showing $C_6H_5CH_2O-C$ groups attached to tetracycline ring system with $R_1$, $R_3$, $R_2$, $N(CH_3)_2$, OH, $CONH_2$ substituents]

should read [corrected chemical structure showing $C_6H_5CH_2O-C-NH$ and $C_6H_5CH_2O-C-N$ groups attached to tetracycline ring system with $R_1$, $R_2$, $R_3$, $N(CH_3)_2$, OH, $CONH_2$ substituents]

SIGNED AND
SEALED
JUN 2 1970

(SEAL)
Attest:

Edward M. Fletcher, Jr.
Attesting Officer

WILLIAM E. SCHUYLER, JR.
Commissioner of Patents